J. R. COOK.
CENTRIFUGAL SWITCH.
APPLICATION FILED FEB. 17, 1913.
1,261,102.
Patented Apr. 2, 1918.
2 SHEETS—SHEET 1.
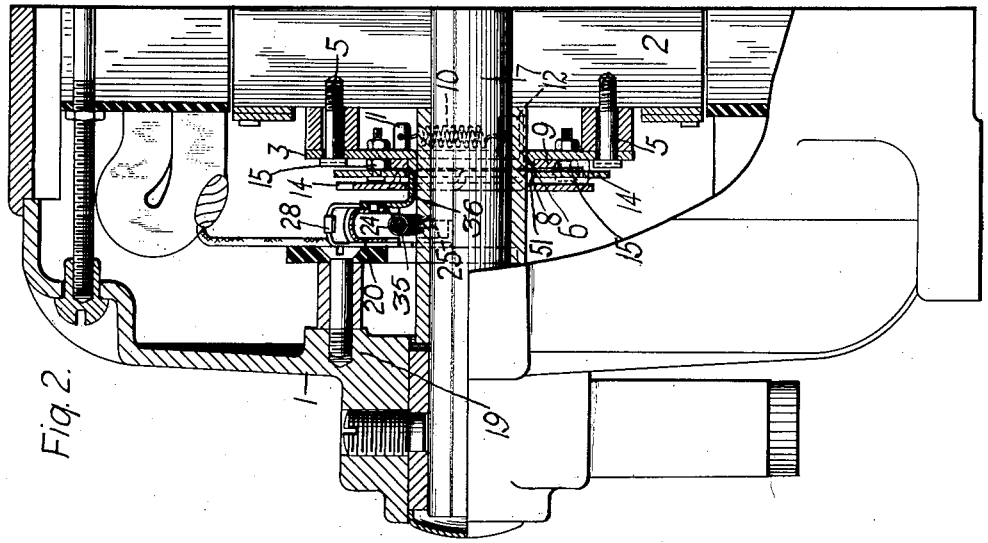
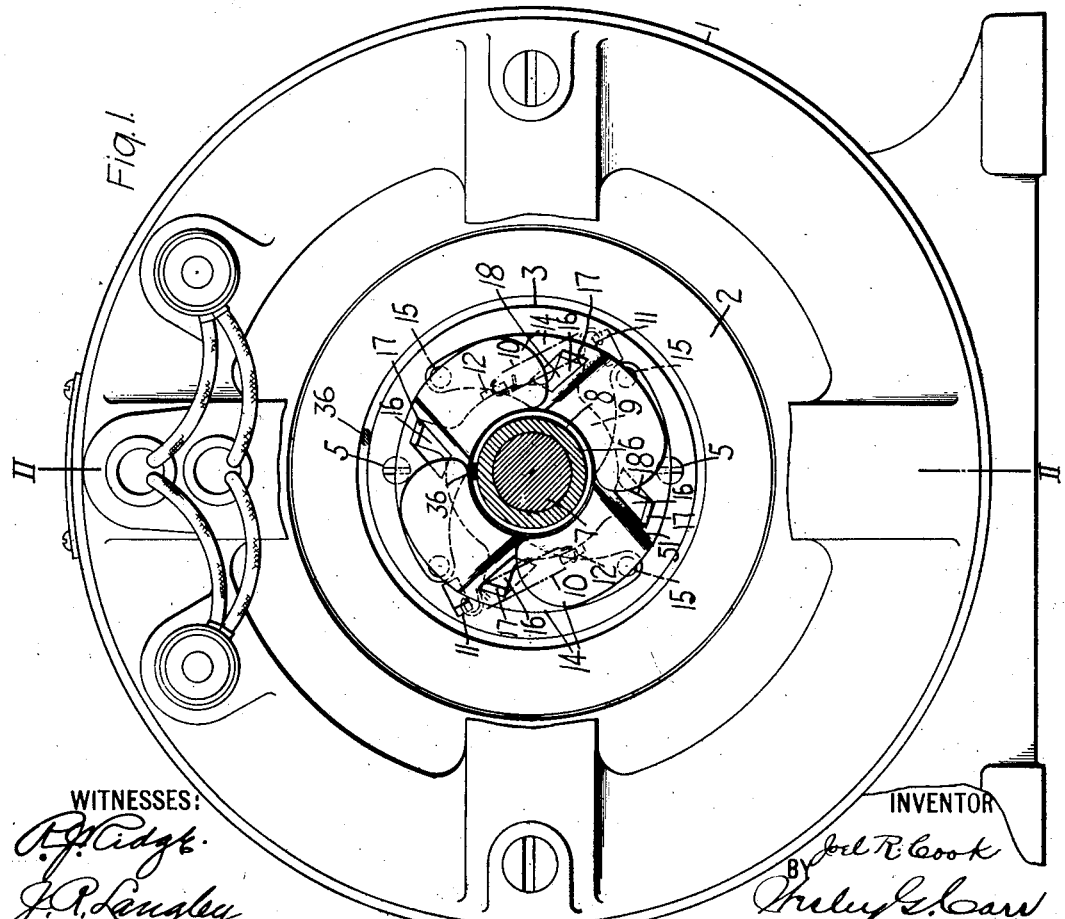

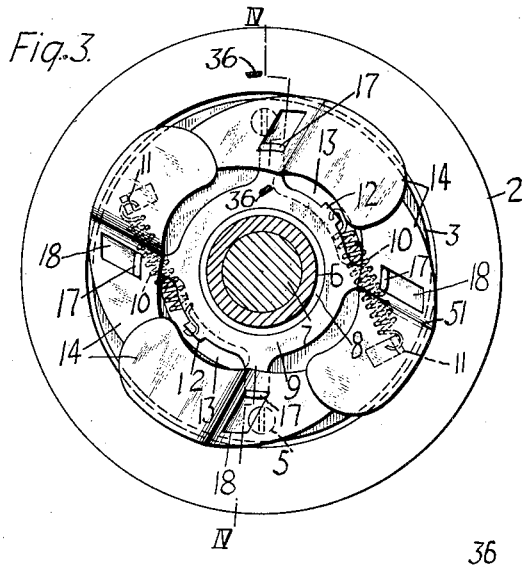

UNITED STATES PATENT OFFICE.

JOEL R. COOK, OF WILKINSBURG, PENNSYLVANIA, ASSIGNOR TO WESTINGHOUSE ELECTRIC AND MANUFACTURING COMPANY, A CORPORATION OF PENNSYLVANIA.

CENTRIFUGAL SWITCH.

1,261,102.   Specification of Letters Patent.   Patented Apr. 2, 1918.

Application filed February 17, 1913. Serial No. 748,858.

*To all whom it may concern:*

Be it known that I, JOEL R. COOK, a citizen of the United States, and a resident of Wilkinsburg, in the county of Allegheny and State of Pennsylvania, have invented a new and useful Improvement in Centrifugal Switches, of which the following is a specification.

My invention relates to centrifugal switches such as are commonly employed in electrical devices in which circuit connections are made and interrupted at predetermined speeds and it has special reference to fan motors of the single phase alternating current induction type and to starting means therefor.

The object of my invention is to provide a switching device of the character indicated above which shall be simple and durable in construction and positive and certain in its action under all conditions.

It is desirable, in practice, to provide single phase induction motors for fan purposes with auxiliary windings of high resistance for starting. Since it has not been possible to break this circuit by any convenient switching means, it has been, to some extent, the practice to leave the winding connected in circuit during the operation of the motor, thus causing unnecessary power losses.

My invention provides a centrifugally operated switch by means of which the circuit of this auxiliary winding is automatically broken when a predetermined speed is reached and automatically closed again upon the speed falling off to a predetermined minimum, or when the motor stops.

In the drawings, Figure 1 is a front view of an induction motor with my invention applied, part of the end bracket of the motor being broken away. Fig. 2 is a side view of the same, partly in section, on the line II—II of Fig. 1. Fig. 3 is a front elevation of the centrifugal device attached to the rotor of a motor, the cams being in their extended positions. Fig. 4 is a longitudinal section on the line IV—IV of Fig. 3, part of the rotor being broken away. Fig. 5 is a front elevation of the stationary member of the switch. Fig. 6 is a diagram of the motor windings and the switch. Fig. 7 is a front elevation, partially in section, of a modification of the switch.

The induction motor 1 has a rotor 2 upon the front face of which is mounted the rotatable member of the centrifugal switch, which comprises a circular plate 3 attached to the rotor 2 by bolts or screws 5 and provided with a central opening 6 for the shaft 7 of the motor. Around the periphery of the opening 6, is an upturned portion forming a circular flange 8 extending outwardly and upon which is rotatably mounted a second plate 9. The relative movement of the plates 3 and 9 is limited by springs 10 severally attached at one end to lugs 11 on the plate 3 and at the other end to projections 12 on the plate 9 which are bent at right angles to project through slots 13 in plate 3. Curved arms or cams 14 are pivotally mounted at 15 upon the plate 3 and are adapted to overlap each other by being bent in an intermediate portion as shown at 51 in Fig. 4, so that the corresponding ends of each cam lie in the same plane, while the opposite ends, which they overlap, lie in a parallel plane. Any desired number of cams may be employed, four being shown in the preferred form of my invention. The cams are so curved that approximate circles are presented by their combined outer peripheries and combined inner peripheries in any position assumed by the cams as they are actuated by centrifugal force.

The plate 9 has four projecting arms 16 bent at right angles at the ends 17 to extend through inclined slots 18 in the cams 14. This construction insures that any movement of the cams on their pivots will cause a corresponding rotative movement of the plate 9 and that the movement of each of the cams is the same because of their interconnection. The movement of the cams is also limited in extent by the slots 18 and members 17.

The stationary member of the switch is located upon a stationary part 19 of the motor and, in one of the preferred forms, as shown in Fig. 5, comprises an arm 20 pivoted at 21 to a supporting member 22 attached to an insulating base 23. A spring 24 is connected at 25 to the supporting member 22 and to the contact member 26 at 27. It will be noted that the arm 20 is in unstable equilibrium when the points 27, 21 and 25 are in alinement, while the spring 24 will tend to rotate the arm 20 in opposite directions when the latter is on opposite sides of the central position. A lug 28 on the member 22 acts as a stop for the arm 20, in one direction. The contact member 26 is pivoted to the arm 20 at 29 and a second contact member 30 is mounted upon the base. Owing to the peculiar shape and arrangement of the various parts, the switch is adapted to make and break the circuits at a point apart from the point designed to make the normal contact for the passage of current.

It will be noted that the contact pieces are of approximately L-shape. When the contacts are brought together, the portions 31 and 32 make contact first by reason of the position in which contact member 26 is held by the spring 24, but the force of the spring is sufficient to swing the arm 20 still farther until surfaces 33 and 34 are in engagement. The contact will be a sliding one because of the rotative movement of the contact member 26 after the engagement of portion 31 and 32, thus insuring clean surfaces and a good electrical contact. Upon the switch being open, the parts 33 and 34 will be separated first by the rotative movement of the contact member 21, since the spring 24 tends to place the points 29, 27 and 25 in alinement. This action will cause any arcs incident to the make and break to take place between parts 31 and 32. A yoke 35 is attached to the switch arm 20, and its arms 36 span the cams 14. Terminals 37 and 38 are provided which connect the contact members 30 and 26 to the auxiliary winding 39 and one of the motor terminals, respectively, the other terminal of the auxiliary winding being connected permanently to the other terminal of the motor. The main motor winding is shown at 40 in Fig. 6.

A modification of the stationary member is shown in Fig. 7 in which the same numerals are used to designate like parts. An arm 41 is preferably integral with the arm 20 while an arm 42 is pivoted at 43 and normally held against a shoulder 44, as shown, by the spring 24 which holds a pivotally mounted contact member 45 with its shoulder 46 against a projection 47 of the arm 42. A contact member 48 has a concave surface 49 which is adapted to be engaged by a convex surface 50 of the contact member 45. When the arm 42 is actuated by the cams 14, it tends to assume a radial position which causes it to rotate in the direction of the arrow, and the contact member 45 is pressed against the surface of contact member 48 as the arm 20 is moved outward, thus insuring a sliding or wiping contact and the breaking of the contact at a point normally not engaged by contact 48. This modification operates as a toggle snap switch in the same manner as the structure shown in Fig. 5.

When the motor circuit is closed through any suitable connections and the motor speeds up, centrifugal force will cause the cams 14 to fly outward against the tension of the springs 10 exerted through the plate 9 and the members 17 and inclined slots 18, and the outer peripheries of the cams will take the position shown in Fig. 3 and engage the yoke 35. The tension of the springs 10 may be adjusted to allow the cams to operate at any predetermined speed to actuate the arm 20 outwardly until it passes its central position, when the spring 24 carries it to its outer position, separating the contacts and breaking the circuit of the auxiliary winding. The cams do not engage the arms when the motor is rotating because of the position taken by the switch arm 20 and the distance between the arms. The outer and inner positions of the yoke arms are shown in section in Figs. 3 and 1, respectively. When the motor slows down or stops, the springs 10 will cause the cams to contract and the inner peripheries of the cams will take the position shown in Fig. 1, and engage the yoke 35, and the arm 20 will swing inwardly and again complete the circuit of the auxiliary winding ready for acceleration or starting.

The advantages of this construction will be apparent to one skilled in the art as the action is positive and automatic at any desired speed, a continuous surface is presented by the cams, and provision is made for clean contact surfaces for the switch. Because of the circular form presented by the cam surfaces in both the expanded and contracted positions, the actuation of the switch arm is accomplished easily and gradually and the striking of a blow by rotating parts is avoided.

While only one application of my improved switch has been shown, it is adapted to be used in connection with any rotatable device in which it is desired to make or break a circuit at any desired speed.

I claim as my invention:

1. The combination with a rotatable shaft, of a switch, and an expansible mechanism carried by said shaft and adapted to open said switch by expanding at a predetermined speed and to close said switch by contracting at another predetermined speed of rotation of said shaft.

2. The combination with a rotatable shaft, of a stationary toggle switch, and a mechanism carried by said shaft and capable of having both internal and external engagement with said switch and adapted to open said switch at a predetermined speed and to close said switch at another predetermined speed of rotation of said shaft.

3. The combination with a rotatable shaft having a centrifugal device mounted thereon, of a stationary switch mounted so as to be engaged both by the inner and by the outer periphery of the centrifugal device, both of said peripheries presenting substantially circular surfaces.

4. The combination with a rotatable shaft, of a stationary toggle snap switch, an expansible ring-like mechanism carried by said shaft, and a member on said switch adapted to be engaged by the inner and by the outer periphery of said mechanism to open and close said switch at predetermined speeds of rotation of said shaft.

5. In combination, a supporting member adapted to rotate, a plurality of cams pivoted to said member and adapted to be thrown outwardly by centrifugal force, said cams being arranged to overlap each other, a plate member rotatably mounted on said supporting member, projections on said plate member adapted to engage slots in said cams and means for yieldingly holding said plate member in one position relative to said supporting member.

6. In combination a rotatable supporting member, a plurality of centrifugally actuated cams pivoted on said member and arranged to overlap each other, said pivots being mounted concentric with the axis of rotation, a member rotatably mounted on said supporting member and engaging each of said cams in an inclined slot, and means for yieldingly holding said engaging member in one position.

7. The combination with a rotatable shaft, of a composite ring carried thereby, said ring being adapted to increase in diameter with an increase in the speed of rotation of said shaft and to decrease in diameter with a decrease in the speed of said shaft, a switch, means for biasing said switch to either the open or the closed position and operating members carried by said switch, one of which is mounted to be engaged by the outer surface of said ring to move said switch to one position and the other of which is mounted to be engaged by the inner surface of said ring to move said switch to the other position.

8. The combination with a rotatable shaft, of a composite ring carried thereby, said ring being adapted to increase in diameter with an increase in the speed of rotation of said shaft and to decrease in diameter with a decrease in the speed of said shaft, a stationary toggle snap switch, and operating members carried by said switch, one of which is mounted to be engaged by the outer surface of said ring to move said switch to one position and the other of which is mounted to be engaged by the inner surface of said ring to move said switch to the other position.

9. The combination with a rotatable shaft having a centrifugal device mounted thereon, of a stationary switch mounted to be engaged both by the inner and by the outer periphery of the centrifugal device, both of said peripheries presenting substantially circular surfaces, said centrifugal device being adapted to open and close said switch at predetermined speeds of rotation of said shaft.

10. The combination with a stationary switch, of a rotatable mechanism for operating the same, comprising an expanding and contracting ring adapted to engage said switch by means of its external and internal peripheries.

In testimony whereof, I have hereunto subscribed my name this 7th day of Feb., 1913.

JOEL R. COOK.

Witnesses:
J. R. LANGLEY,
B. B. HINES.